(12) United States Patent
Jones (10) Patent No.: US 8,369,229 B2
(45) Date of Patent: *Feb. 5, 2013

(54) METHODS FOR MONITORING DELIVERY PERFORMANCE OF A PACKET FLOW BETWEEN REFERENCE NODES

(75) Inventor: Lawrence W. Jones, Woburn, MA (US)

(73) Assignee: Verizon Services Corp., Ashburn, VA (US)

( * ) Notice: Subject to any disclaimer, the term of this patent is extended or adjusted under 35 U.S.C. 154(b) by 1176 days.

This patent is subject to a terminal disclaimer.

(21) Appl. No.: 11/497,841

(22) Filed: Aug. 2, 2006

(65) Prior Publication Data

US 2006/0268718 A1 Nov. 30, 2006

Related U.S. Application Data

(63) Continuation of application No. 11/368,706, filed on Mar. 7, 2006.

(60) Provisional application No. 60/659,250, filed on Mar. 7, 2005.

(51) Int. Cl.
*H04L 12/26* (2006.01)

(52) U.S. Cl. ......... 370/248; 370/249; 370/252; 709/224

(58) Field of Classification Search .......... 370/241–253; 726/22, 23; 709/223, 224, 228, 231
See application file for complete search history.

(56) References Cited

U.S. PATENT DOCUMENTS

| | | | | |
|---|---|---|---|---|
| 6,965,577 | B1* | 11/2005 | Murphy | 370/255 |
| 7,359,329 | B2* | 4/2008 | Kikuchi et al. | 370/242 |
| 7,457,868 | B1* | 11/2008 | Guo | 709/224 |
| 2003/0093244 | A1* | 5/2003 | Corlett et al. | 702/186 |

OTHER PUBLICATIONS

Hwang, Enoch; Digital Logic and Microprocessor Design with VHDL; Oct. 10, 2004; Chapter 6 p. 3.*
RFC 2463, Internet Control Message Protocol (ICMPv6), for The Internet Protocol Version 6 (IPv6) Specification, Dec. 1998.
Postel, RFC 792—Internet Control Message Protocol, Sep. 1981.
Stevens, W. Richard. "TCP-IP Illustrated, Volume 1: The Protocols." Addison-Wesley 1994.

* cited by examiner

*Primary Examiner* — Habte Mered (57) ABSTRACT

In one of many possible embodiments, a method may comprise using one or more packet delivery monitoring packets to monitor packet delivery between a first reference node and a second reference node communicatively coupled to one another by at least one network path, each of said PDM packets comprising an Internet Control Message Protocol packet modified to include at least one packet delivery monitoring extension.

35 Claims, 5 Drawing Sheets

| Sequence Numbers | Flow Counts | Timestamps |
|---|---|---|
| SN-1 | FC-1 | TS-1 |
| SN-2 | FC-2 | TS-2 |
| SN-3 | FC-3 | TS-3 |
| SN-4 | FC-4 | TS-4 |

METHODS FOR MONITORING DELIVERY PERFORMANCE OF A PACKET FLOW BETWEEN REFERENCE NODES

CROSS-REFERENCE TO RELATED APPLICATIONS

This is a continuation of co-pending U.S. patent application Ser. No. 11/368,706 by Lawrence W. Jones, filed Mar. 7, 2006, and entitled SYSTEMS AND METHODS FOR MONITORING PACKET DELIVERY, which application claims the benefit of U.S. Provisional Patent Application No. 60/659,250, filed Mar. 7, 2005, each of which is incorporated herein by reference in its entirety.

BACKGROUND INFORMATION

Advancements in network technologies have increased the number and types of services provided over networks. Many network-based services provide guaranteed levels of service that generally stipulate a need for monitoring network performance in order to maintain the guaranteed service levels. Consequently, performance monitoring technologies have been developed to measure network performance.

Conventional performance monitoring technologies are typically divided into two different categories commonly known as passive and active performance monitoring technologies. Passive performance monitoring technologies typically monitor network signals as they pass through a given point of a network. This type of monitoring provides only limited information that does not account for events that occur at other points in the network. In particular, passive monitoring technologies are unaware of upstream events (e.g., packets being dropped) that affect network performance.

Active performance monitoring technologies generally involve injecting dedicated monitoring messages into network traffic and using the dedicated messages as a sample from which to infer network performance measurements. Unfortunately, the sample-based inferences do not always accurately reflect actual network performance. Moreover, conventional active performance monitoring technologies are known to significantly increase the traffic loads carried by and/or hardware investments associated with the networks being monitored.

For example, certain performance monitoring technologies rely upon control and/or test protocols that are dedicated exclusively for monitoring network performance. The implementation of such performance monitoring technologies typically requires that network devices be configured to recognize and respond to the dedicated test and/or control protocols. This increases the overhead of network resources because a certain amount of the network resources (e.g., bandwidth and processing capacity) must be reserved for handling dedicated performance monitoring traffic. In addition, network devices may operate on platforms that are incompatible with certain dedicated test and control protocols. In some cases, dedicated test and control protocols are proprietary to vendors and unavoidably force network service providers to rely on a specific vendor.

Other active performance monitoring technologies use existing protocols to estimate network performance measurements. These conventional technologies also have shortcomings. For example, "ping" messages such as those used in the Internet Control Message Protocol have been used to estimate round-trip packet loss based on the fraction of ping messages that go unacknowledged. However, as with other conventional active performance monitoring technologies, only sample-based estimates of packet loss are provided. The estimates can be unreliable for a number of reasons, including differences between ping messages and actual data traffic. Moreover, the estimates can be skewed because network devices often give low priority to ping messages during high-traffic periods.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

Preferred embodiments according to the present invention may be implemented as systems and methods for monitoring packet delivery over one or more paths of a network. As used herein, the term "packet delivery" is intended to include any information that may be descriptive of the performance of one or more paths of a network in the transmission, propagation, and/or receipt communication signals such as packets. In certain embodiments, packet delivery measurements include a determined percentage and/or number of packets successfully transmitted over a path of a network (i.e., a path between two network devices). The number of packets delivered may be determined by subtracting the number of packets lost (i.e., not successfully transmitted over the path) during transmission of packets over the path from the total number of packets transmitted. The number of packets lost may be determined as described further below.

Packet delivery may be monitored for one or more flows of packets (i.e., packet flows). The term "packet flow" refers to a particular group of packets within an aggregate packet stream that is transmitted between two network devices. Packets within a particular packet flow are related by one or more common attributes. Examples of attributes that may be used to identify a packet flow (or the packets belonging to a packet flow) can include, but are in no way limited to, protocol type, source address, destination address, source port (e.g., transport protocol source port), destination port (e.g., transport protocol destination port), and any combination or sub-combination thereof. The source and destination ports may be used to indicate the direction (i.e., upstream or downstream) of a packet flow.

The systems and methods disclosed herein may employ hybrid combinations of both passive and active packet delivery monitoring functions to provide accurate measurements of the number of packets lost and/or delivered between two or more network nodes. For example, an exemplary system may include two reference nodes (e.g., two network devices) configured to cumulatively count the number of packets associated with one or more predefined packet flows that are received at the nodes. The exemplary system may also include a monitoring protocol configured to periodically transmit one or more control messages to the reference nodes instructing the nodes to latch current count values. The monitoring protocol may be further configured to retrieve and use the latched count values to determine packet loss and/or delivery measurements for the predefined packet flow(s). By passively monitoring packet flows and actively latching count values periodically, the exemplary system provides a hybrid performance measurement tool that is able to determine precise and explicit packet loss and delivery measurements.

As described further below, the systems and methods described herein may utilize a modified network communication protocol (i.e., a monitoring protocol) for packet delivery monitoring control messages. Because the network communication protocol is widely deployed in networks, modifying the protocol to form packet delivery monitoring control messages helps minimize the costs and burdens associated with monitoring packet delivery. For example, network devices configured to process the widely deployed network communication protocol can be readily modified to host the systems and methods described herein.

II. Exemplary System

Figure 1:
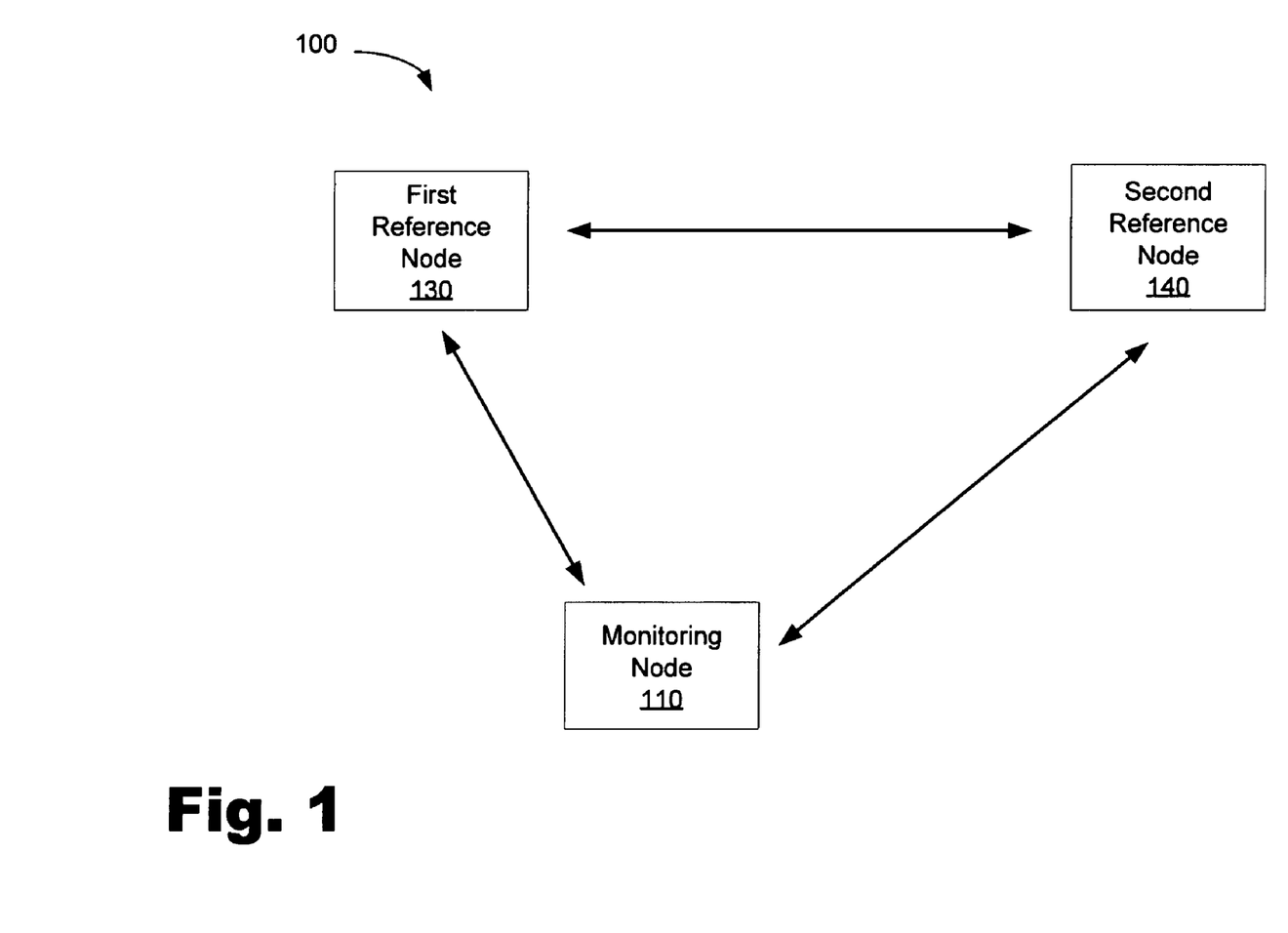
FIG. 1 is a block diagram illustrating an exemplary system for monitoring packet delivery, according to an embodiment.

Turning now to the figures, FIG. 1 is a block diagram illustrating an exemplary system 100 for monitoring packet delivery, according to an embodiment. As shown in FIG. 1, system 100 may include monitoring node 110, first reference node 130 (also referred to as "thru reference node 130" or simply "reference node 130"), and second reference node 140 (also referred to as "reflecting reference node 140" or simply "reference node 140"). As described below, monitoring node 110 may be configured to monitor packet delivery associated with one or more packet flows transmitted over one or more paths between reference node 130 and reference node 140. One or more different paths may connect the reference nodes 130 and 140, and a network path connecting the reference nodes 130 and 140 may include one or more segments or hops, as will be understood by those skilled in the art. The exemplary monitoring protocol described herein may be used to monitor packet delivery over any stable path connecting the reference nodes 130 and 140.

Each of the monitoring node 110, first reference node 130, and second reference node 140 may include or be implemented on one or more physical computing devices, including, but not limited to, network elements, servers, routers, switches, gateways, multiplexers, network interface devices ("NIDs"), network access devices (e.g., modems, DSL modems, network interface cards, set-top boxes, etc.), and computers. In certain embodiments, for example, monitoring node 110 includes one or more servers, and references nodes 130 and 140 include routers.

The elements shown in FIG. 1 may be implemented as software, hardware, firmware, or combinations thereof. In many embodiments, the elements shown in FIG. 1 are in the form of software or firmware modules configured to be executed on one or more computing devices. Thus, system 100 may be implemented on more than one physical computing device, which may include any computing devices listed above. System 100 may employ any of a number of computer operating systems known to those skilled in the art, including, but by no means limited to, known versions and/or varieties of the Microsoft Windows® operating system, the Unix operating system, the Linux operating system, and operating systems known for their use in network devices.

Accordingly, those skilled in the art will recognize that the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computing device (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The arrows connecting the elements shown in FIG. 1 represent communications between the elements. Communications between the elements may be transmitted and received over one or more communication networks suitable for carrying communications between monitoring node 110, first reference node 130, and second reference node 140. For example, the one or more communication networks may include, but are not limited to, the Internet, World Wide Web, and/or one or more intranets, local area networks, wide area networks, metropolitan area networks, voice communication networks (e.g., the Public Switched Telephone Network ("PSTN"), Voice over Internet Protocol ("VoIP"), and wireless telephone networks), optical fiber networks, multimedia networks, video networks (e.g., Internet Protocol ("IP") video networks), access networks, packet-switched networks, circuit-switched networks, Internet Protocol based ("IP-based") networks, and any other communications networks capable of carrying communications between monitoring node 110, first reference node 130, and second reference node 140.

The elements of FIG. 1 may communicate using any known communication technologies, devices, media, and protocols supportive of remote data communications, including, but not limited to, data transmission media, communications devices, Transmission Control Protocol ("TCP"), Internet Protocol ("IP") (including version four ("IPv4") and/or version six ("IPv6")), Internet Control Message Protocol ("ICMP") (including version four ("ICMPv4") and/or version six ("ICMPv6")), File Transfer Protocol ("FTP"), telnet, Hypertext Transfer Protocol ("HTTP"), socket connections, packet-switching technologies, circuit-switching technologies, wireless communication technologies (e.g., cellular telephone and wireless access technologies), and any other suitable communications technologies. Accordingly, system 100 may be used to monitor packet delivery over a wide variety of different types of communication networks.

In certain embodiments, monitoring node 110, reference node 130, and reference node 140 are configured to communicate with one another using new ICMP-based communications that are useful for monitoring packet delivery. ICMP is a well-known error and control communication protocol used in networks configured for Internet Protocol ("IP") communications. ICMP is described in IETF RFC 792, the contents of which are hereby incorporated by reference in their entirety. ICMPv6 is described in IETF RFC 2463, the contents of which are hereby incorporated by reference in their entirety.

ICMP messages may be modified to form new ICMP-based messages that are useful for monitoring packet delivery. The new ICMP-based messages may be referred to as packet delivery monitoring ("PDM") messages and may be used as part of a monitoring protocol, as described below, for monitoring packet delivery between the first reference node 130 and the second reference node 140.

Figure 2:
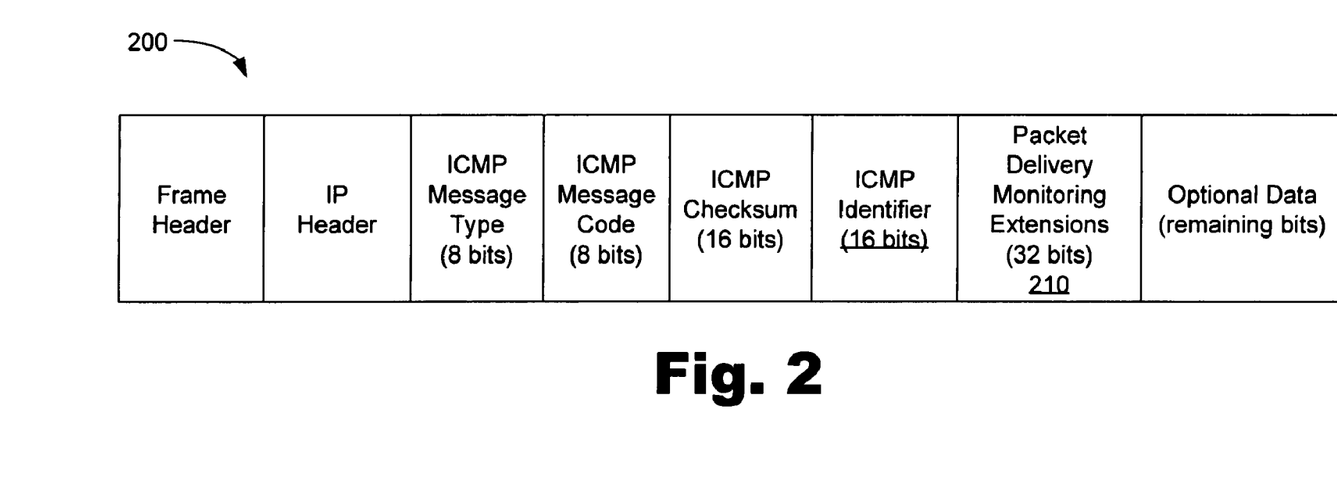
FIG. 2 is a representation of an exemplary packet delivery monitoring data packet having packet delivery monitoring extensions included therein, according to an embodiment.

PDM messages may be in the form of ICMP packets modified to include one or more packet delivery monitoring extensions. FIG. 2 is a representation of an exemplary PDM packet 200, according to an embodiment. The PDM packet 200 includes an ICMP packet that has been modified with packet delivery monitoring ("PDM") extensions 210. The frame header, IP header, ICMP message type, ICMP message code, ICMP checksum, ICMP identifier, and optional data fields shown in FIG. 2 are described in RFC 792 and/or RFC 2463, both of which have been incorporated by reference. In addition to these fields, the PDM packet 200 may include PDM extensions 210 in one or more other fields.

Figure 3:
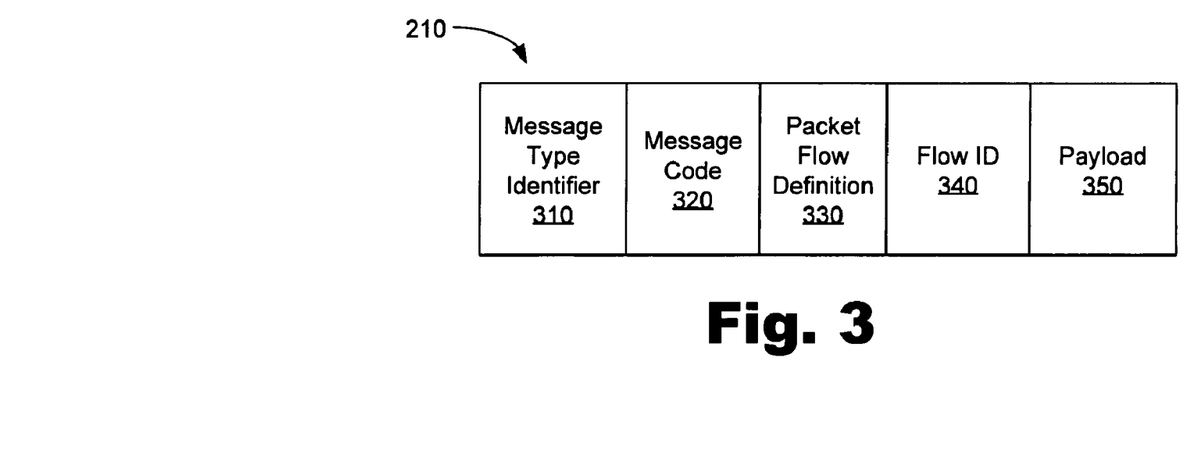
FIG. 3 is a representation of exemplary packet delivery extensions that may be included in the data packet of FIG. 2, according to an embodiment.

PDM extensions 210 (or simply "the extensions 210") may include any data potentially useful for monitoring packet delivery between network nodes. FIG. 3 is a representation of exemplary extensions 210, according to an embodiment. As shown in FIG. 3, the extensions 210 may include a message type identifier 310 indicative of the packet 200 being a PDM packet type, a message code 320, a packet flow definition 330, a flow identifier ("flow ID") 340 associated with a particular packet flow, and a payload 350 of data representative of parameters associated with the transmission of the packet flow identified by the packet flow definition 330. The message type identifier 310 may include an identifier that is unique from conventional ICMP identifiers to indicate that the packet 200 is a PDM-type message.

The message code 320 may indicate a class of PDM message. In certain embodiments, for example, five different exemplary classifications of PDM messages are defined, including monitoring request messages (i.e., flow identifier ("ID") assignment request messages), monitoring reply messages (i.e., flow ID assignment reply messages), received packet count latch ("RPCL") messages, received packet count retrieve request messages, and received packet count retrieve reply messages. Examples of these five classifications of PDM messages will be described further below in relation to their transmissions between monitoring node 110, first reference node 130, and second reference node 140. Of course, the five classifications of PDM messages are exemplary; other classifications and groups of classifications of PDM messages may be used in other embodiments.

As described above, packet delivery measurements may be determined for a packet flow transmitted over a path between reference nodes 130 and 140. Accordingly, the extensions 210 may include data representative of a packet flow definition 330, which data indicates that a particular packet 200 is associated with monitoring of a particular packet flow. The packet flow definition 330 may include data representative of one or more attributes that may be used to identify a packet flow. The packet flow definition 330 may include data representative of a protocol type, source address, destination address, source port (e.g., transport protocol source port), destination port (e.g., transport protocol destination port), and any combination or sub-combination thereof. Data included in the packet flow definition 330 may be referred to as pattern matching criteria. The packet flow definition 330 may include wildcards for certain attributes or portions of attributes. For example, one or more IP addresses, or portions of IP addresses, may be a wildcard value. This can be used to support aggregates of IP addresses, ports, protocol, or combinations thereof.

The flow definition 330 may be used to specify the direction of a packet flow (i.e., whether the packet flow is being transmitted from the first reference node 130 to the second reference node 140 or vice versa). For example, the source and destination ports and/or addresses may be used to indicate the direction of a packet flow By way of another example, the flow definition 330 may include a variable designated to indicate the direction of a flow. The flow definition 330 may also include a bi-directional variable that may be set and used to control whether a control message is used to latch a flow count for a packet flow traveling in a particular direction or to latch flow counts for packet flows traveling in both upstream and downstream directions between the reference nodes 130 and 140.

The flow ID 340 may include data representative of a packet flow identifier useful for identifying the corresponding packet flow defined in the packet flow definition 330. Accordingly, the flow ID 340 may be used in control messages after it has been associated with a particular flow definition 330. The reference nodes 130 and 140 may be configured to associate specific flow ID values with their corresponding flow definitions 340. For example, reference node 130 may be configured to recognize a particular flow ID value and recognize that the flow ID value has been predefined as being associated with a packet flow traveling in a specific direction between the reference nodes 130 and 140.

The extensions 210 shown in FIG. 3 are typically used for a monitoring request message. Other PDM message types may include additional, fewer, or different extensions. For example, the extensions 210 may include other data such as sequence numbers and counters. For example, PDM latch message types may include sequence numbers configured to be used by the reference nodes 130 and 140 to latch packet monitoring data and to associate latched data with sequence numbers, as described further below. In some examples, PDM latch messages may also include a reference node counter configured to be incremented at each reference node. The counter can be used to verify that each reference node received and processed a PDM latch message, or to instruct a reference node to latch or not latch upon receipt of the PDM latch message. Exemplary uses of the extensions 210 will be described further below in reference to FIG. 4A.

Monitoring node 110, first reference node 130, and second reference node 140 may be configured to process PDM messages such as the PDM packet 200 shown in FIG. 2. For example, monitoring node 110, first reference node 130, and second reference node 140 may be configured to generate and/or recognize PDM-type packets, PDM codes, and any other PDM extensions 210 described above, and to perform actions based on the data included in PDM messages. Routers or other suitable network devices that have been configured to support packet delivery monitoring packets can function as reference nodes (e.g., reference nodes 130 and 140).

The use of ICMP as a base protocol for new packet delivery monitoring messages (e.g., PDM packet 200) minimizes the overhead associated with monitoring packet delivery. As mentioned above, because ICMP is widely deployed in IP-based networks, many network devices are already configured to process ICMP messages. Such network devices can be easily configured to process PDM messages without incurring expenses comparable to the costs associated with employing a separate and dedicated test and/or control protocol.

Returning now to FIG. 1, system 100 is able to monitor packet delivery for one or more packet flows transmitted between reference nodes 130 and 140. System 100 can monitor packet delivery for any packet flow that is transmitted over a known and stable path between reference nodes 130 and 140. As mentioned above, the path between the reference nodes 130 and 140 may include any suitable number of network nodes and segments (i.e. hops). System 100 is especially well-suited for situations in which the same path is used during the duration of a packet flow transmission. Such situations are practical and common because routers typically use a common routing decision to forward packets within the same packet flow in order to avoid packet re-ordering.

In general, monitoring node 110 may be configured to communicate with reference nodes 130 and 140 to initiate packet monitoring for one or more packet flows transmitted between the reference nodes 130 and 140. Each of the reference nodes 130 and 140 then cumulatively counts the number of packets associated with the specified packet flow(s) that are received at the respective reference node 130 or 140. Monitoring node 110 may periodically instruct the reference nodes 130 and 140 to latch packet monitoring data (e.g., current counts of packets received). Monitoring node 110 may be configured to retrieve the latched data and use the retrieved data to determine packet delivery measurements, as described below.

While the examples described herein are presented with reference to the monitoring node 110 being configured to perform packet delivery monitoring functions, this is not limiting. The packet delivery monitoring functions and protocol described herein may be implemented at any suitable computing device(s). For example, the monitoring functions and protocol described herein may be implemented at one of the reference nodes 130 or 140.

Figure 4A:
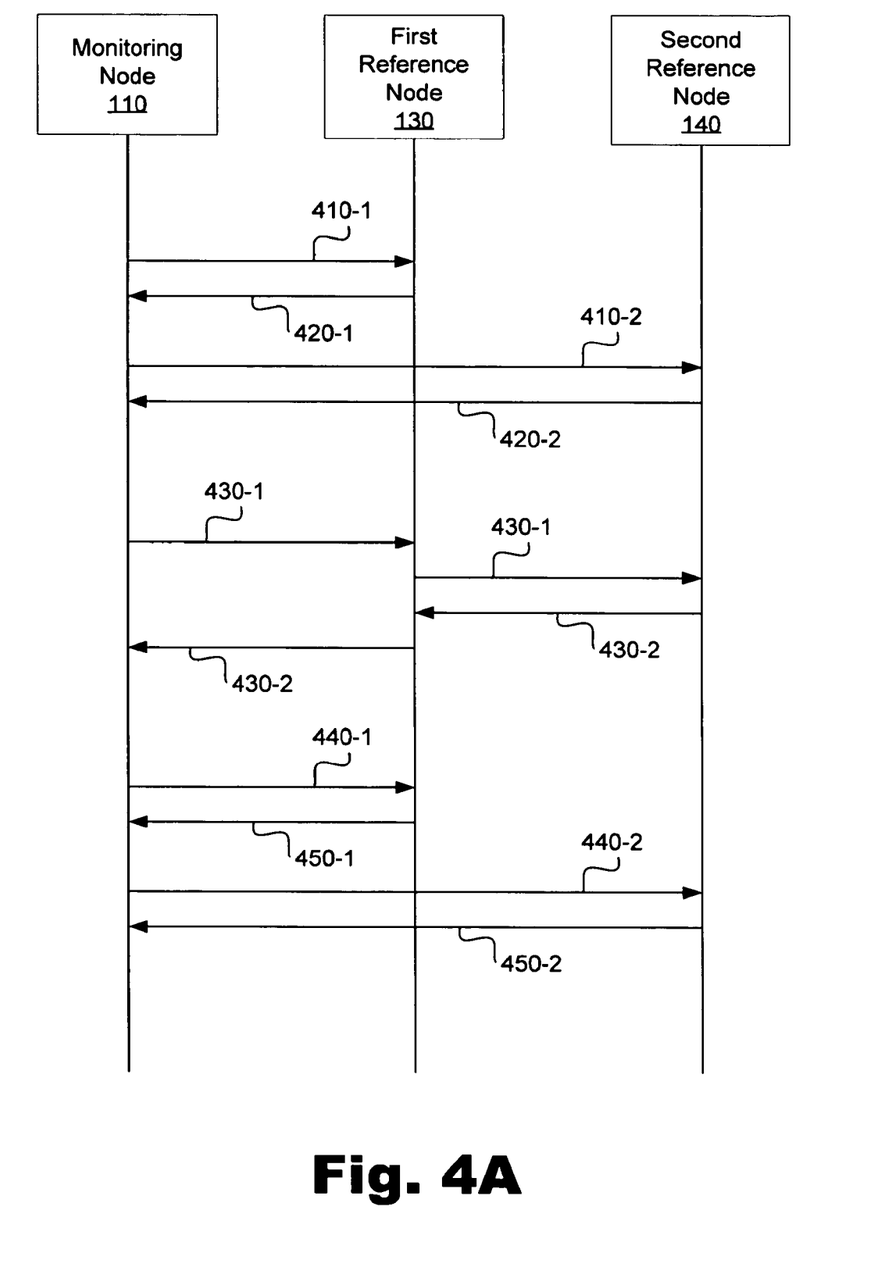
FIG. 4A illustrates an exemplary flow of packet delivery monitoring messages between the elements of FIG. 1, according to an embodiment.

FIG. 4A illustrates an exemplary flow of packet delivery monitoring ("PDM") messages between the elements of FIG. 1, according to an embodiment. The exemplary flow of PDM messages and the functions associated therewith may be referred to as a monitoring protocol, which protocol is configured to monitor packet delivery between reference nodes such as references nodes 130 and 140.

Monitoring node 110 may begin a packet delivery monitoring process by selecting two reference nodes such as first reference node 130 and second reference node 140. The selection of the reference nodes establishes the scope of the packet delivery monitoring to be performed. In particular, the selected reference nodes define the endpoints of a path of a network to be monitored. Monitoring node 110 may designate one reference node (e.g., the first reference node 130) as a "thru" reference node and the other reference node (e.g., the second reference node 140) as a "reflecting" reference node.

Monitoring node 110 may transmit a separate flow ID assignment request message ("flow ID request") to each of the selected reference nodes to request that the reference nodes begin monitoring packets for a particular packet flow. A flow ID request is one of the exemplary five classes of PDM messages described above. As shown in FIG. 4A, monitoring node 110 may send flow ID request 410-1 to reference node 130 and flow ID request 410-2 to reference node 140.

Each flow ID request (e.g., each of flow ID requests 410-1 and 410-2) may include information useful for identifying a particular flow of packets that is being or will be transmitted between reference node 130 and reference node 140. The information may include any information useful for identifying a packet flow, including, but not limited to, any of the flow definition information described above (e.g., attributes such as a source address, a destination address, a source port, a destination port, protocol ID, direction variable, and bi-directional variable). Each flow ID request may also include a flow identifier ("flow ID") to be used to identify the flow being monitored. The flow ID provides a convenient way to index and reference data gathered for a packet flow.

Upon receiving a flow ID assignment request, each of the reference nodes 130 and 140 recognizes that it is being requested to function as a reference node for monitoring packet delivery. Each of the reference nodes 130 and 140 may be configured to allocate and initialize one or more data structures (e.g., one or more tables and/or hashing entries) to be used for monitoring packets (e.g., counting packets) that match the packet flow definition in the flow ID requests 410-1 and 410-2.

If the initialization is successful, then each of the respective reference nodes 130 and 140 transmits a flow ID assignment reply message (e.g., a flow ID reply") to the monitoring node 110 to indicate that a successful flow identification assignment has been performed and that each of the respective reference nodes 130 and 140 has been activated to monitor packets that match the packet flow definition. A flow ID reply is one of the five classes of PDM messages described above. As shown in FIG. 4A, reference node 130 may send flow ID reply 420-1 and reference node 140 may send flow ID reply 420-2 to the monitoring node 110. Each of the reference nodes 130 and 140 will begin to cumulatively count all received packets that match the packet flow definition.

If the initialization is unsuccessful for some reason (e.g., packet delivery monitoring functions are not enabled in the particular reference node), the flow ID reply sent to the monitoring node 110 will include an error message indicating the initialization was not successful.

Monitoring node 110 may be configured to transmit received packet count latch ("RPCL") messages (or simply "count latch messages") to reference node 140 by way of reference node 130. A count latch message is one of the five classes of PDM messages described above. As described below, each count latch message can be configured to instruct the reference nodes 130 and 140 to latch current count values for at least one packet flow. The latched count values may be used to determine packet loss and delivery rates for the packet flow(s), as described below.

Each count latch message may include at least one flow ID associated with a particular packet flow (e.g., the flow ID included in the flow ID request described above). The flow ID identifies the packet flow for which the packet count is to be latched. Because each packet flow being monitored may be assigned a unique flow ID, monitoring node 110 is able to monitor one or more packet flows, including packet flows being concurrently transmitted between the same two reference nodes.

Each count latch message may also include a sequence number. Sequence numbers represent an order in which count latch messages are transmitted from the monitoring node 110 to the reference nodes 130 and 140. Typically, a subsequent count latch message will include an incremented sequence number. As described below, the sequence numbers can be used by the reference nodes 130 and 140 to identify corresponding latched flow counts. Accordingly, monitoring node 110 is able to use corresponding flow counts to determine packet delivery measurements.

Upon receiving a count latch message, each of the reference nodes 130 and 140 is configured to latch (i.e., store) the current cumulative number of packets that the respective reference node has received prior to the count latch message being received and that match the flow ID included in the count latch message. The latching should be performed before a subsequent data packet associated with the same packet flow is received. The latched value may be referred to as the latched "flow count" and may represent the total number of packets of the identified packet flow that have been received by the reference node up to just prior to the time that the count latch message is received by the reference node. The latch count should not include a count of any packets arriving subsequent to the court latch message being received. Each of the reference nodes 130 and 140 can store the flow count to a predefined variable in a data structure (e.g., a look-up table) associated with the relevant packet flow.

Each of the reference nodes 130 and 140 may be configured to store the sequence number included in a latch count message (or corresponding instances of a latch count message) such that the stored sequence number is associated with the latched flow count. In this manner, each of the reference nodes 130 and 140 is able to build a separate table of latched flow count and sequence number pairs for each packet flow being monitored. The table of pairs is indexed by the flow ID assigned to identify the associated packet flow, and each pair may be indexed by a sequence number. An example table of latched data will be described further below with reference to FIG. 4B.

Flow counts latched at the reference nodes 130 and 140 for a particular flow count message will include a common sequence number to indicate that the flow counts are related to the same flow count message. This enables monitoring node 110 to identify which flow count latched by the first reference node 130 corresponds with a particular flow count latched by the second reference node 140. Accordingly, corresponding sequence numbers and latched flow counts can be used to determine packet delivery measurements for a packet flow traveling between reference nodes 130 and 140.

A count latch message typically travels from the monitoring node 110 to the first reference node 130 and from the first reference node 130 to the second reference node 140, which modifies and reflects the count latch message back to the monitoring node 110 via the first reference node 130. In other words, a count latch message generally completes a roundtrip between the monitoring mode 110 and the second reference node 140. FIG. 4A shows monitoring node 110 transmitting a count latch message 430-1 to the first reference node 130, which forwards the count latch message 430-1 to the second reference node 140. The first reference node 130 may recognize that its address is not the destination address included in the count latch message. The first reference node 130 will then forward the count latch message 430-1 to the second reference node 140.

The second reference node 140 may be configured to recognize its address being the destination address included in the count latch message 430-1 and to reflect a modified count latch message 430-2 toward the monitoring node 110 via the first reference node 130. The second reference node 140 is configured to do this by swapping the destination and source addresses in the count latch message 430-1 to form count latch message 430-2. In other words, count latch message 430-1 may include a destination address identifying the second reference node 140 and a source address identifying the monitoring node 110, and the second reference node 140 can swap the source and destination addresses to reflect count latch message 430-2 back to the monitoring node 110.

The roundtrip of a count latch message (i.e., count latch message 430-1 and modified count latch message 430-2) between monitoring node 110 and the second reference node 140 by way of the first reference node 130 can serve several useful purposes. For example, by receiving count latch message 430-2, monitoring node 110 is able to verify that the count latch message 430-1 was successfully received and reflected by the second reference node 140.

In addition, a count latch message may include a counter that enables the monitoring node 110 to verify that the count latch message was received by both of the reference nodes 130. For instance, a count latch message may include a reference node counter ("RNC"), and each of the reference nodes 130 and 140 may be configured to increment the RNC upon receipt of the count latch message. Monitoring node 110 may then use the value of the RNC to verify the number of times a count latch message traversed a reference node.

When the bi-directional variable described above is set to a value that enables bi-directional latching functions, the counter may be used to filter out one of the directions. In other words, the counter may be used for selective latching by one or more of the reference nodes 130 and 140. For example, the counter may be set initially and the reference nodes 130 and 140 configured to selectively latch data based on the value of the counter. This feature may be used to enable latching of flow counts for both upstream and downstream packet flows. For example, when the packet flow being monitored is traveling in the direction from the first reference node 130 to the second reference node 140, the counter may be set to instruct the first reference node 130 to latch the flow count upon receipt of an outgoing count latch message but not upon receipt of the reflected count latch message. With reference to FIG. 4A, for example, the first reference node 130 may latch a flow count upon receipt of the count latch message 430-1 but not upon receipt of the modified count latch message 430-2.

On the other hand, when the packet flow being monitored is traveling in the opposite direction (i.e., from the second reference node 140 to the first reference node 130), the counter may be set to instruct the first reference node 130 to latch the flow count upon receipt of a reflected count latch message but not upon receipt of the outgoing count latch message. In this case, the first reference node 130 may latch a flow count upon receipt of the modified count latch message 430-2 but not upon receipt of the count latch message 430-1. In this manner, monitoring node 110 is able to control packet delivery monitoring for both upstream and downstream packet flows, without having to have two separate controllers at either end of a path being monitored, thereby minimizing costs as compared to conventional performance monitoring technologies that use a controller at both ends of a path.

Alternatively, the bi-directional variable described above and the flow definition 330 may be used in combination to determine whether uni-directional latching or bi-directional latching is enabled. For example, when the bi-directional variable is set to a first value configured to enable bi-directional latching functions, one or more identifiers included in the flow definition 330 (e.g., a source and a destination port identifier) may be used in a "logical OR" test condition such that latching will occur for packet flows traveling in two directions. On the other hand, when the bi-directional variable is set to a second value that is configured to disable bi-directional latching functions, one or more identifiers included in the flow definition 330 (e.g., a source and a destination port identifier) may be used in a "logical AND" test condition such that latching will occur for a packet flow traveling in a specific direction. Accordingly, the flow definition 330 and bi-directional variable included therein may be used to control whether latching is performed for an upstream or downstream packet flow.

In certain embodiments, the reference nodes 130 and 140 may be configured to latch flow counts multiple times (e.g., twice) each for a single direction traversed by a count latch message transmitted by the monitoring node 110. For example, the first reference node 130 may be configured to latch a first flow count upon receipt of an outgoing count latch message (e.g., count latch message 430-1) and another flow count upon receipt of a reflected count latch message (e.g., count latch message 430-2). The second reference node 140 may be configured to latch a first flow count upon receipt of the outgoing count latch message (e.g., count latch message 430-1) and another flow count upon reflection of the modified count latch message (e.g., count latch message 430-2) back toward the monitoring node 110. In such embodiments, packet flows should be direction specific. Accordingly, for a roundtrip of a count latch message, the reference nodes 130 and 140 can latch a set of flow counts for two separate packet flows, where the packet flows travel in opposite directions between the reference nodes 130 and 140. The count latch message may include a flow ID for each of the packet flows.

The roundtrip of a count latch message may also be used to determine latency over a network path. For example, monitoring node 110 may be configured to time stamp the transmission of a count latch message and the receipt of the reflected count latch message and use the timestamps to determine a latency of a path between the monitoring node 110 and the second reference node 140. Alternative to, or in addition to, this feature, monitoring node 110 may be configured to determine a latency of a path between the reference nodes 130 and 140. The first reference node 130 may be configured to record a timestamp both when an outgoing count latch message is received and when the reflected count latch message is received and use the timestamps to determine a latency over a path connecting the first reference node 130 and the second reference node 140.

Monitoring node 110 may be configured to send one or more count latch messages for any particular packet flow periodically, in accordance with a predefined schedule, or in response to recognition of the occurrence of a predefined event. In certain embodiments, monitoring node 110 is configured to periodically transmit count latch messages to the reference nodes 130 and 140. Accordingly, the reference nodes 130 and 140 can build up tables of latched flow counts and corresponding sequence numbers for one or more packet flows transmitted between the reference nodes 130 and 140. As described below, flow counts for subsequent sequence numbers can be used to determine a packet delivery measurement for a group or block of data packets associated with a packet flow.

Monitoring node 110 may be configured to retrieve latched data (e.g., pairs of flow counts and sequence numbers) from reference nodes 130 and 140. For example, monitoring node 110 can transmit a retrieval request message ("retrieval request") to any particular reference node to request that the node provide latched data. A retrieval request is one of the five classes of PDM messages described. FIG. 4A shows that monitoring node 110 may be configured to send a retrieval request message 440-1 to reference node 130 and a retrieval request message 440-2 to reference node 140. Each retrieval request may include a flow ID useful for identifying a particular packet flow, as well as a sequence number useful for identifying a particular set of latched data (e.g., a row of data in a flow ID table). The reference nodes 130 and 140 can use the flow ID and sequence number to index latched data.

Figure 4B:
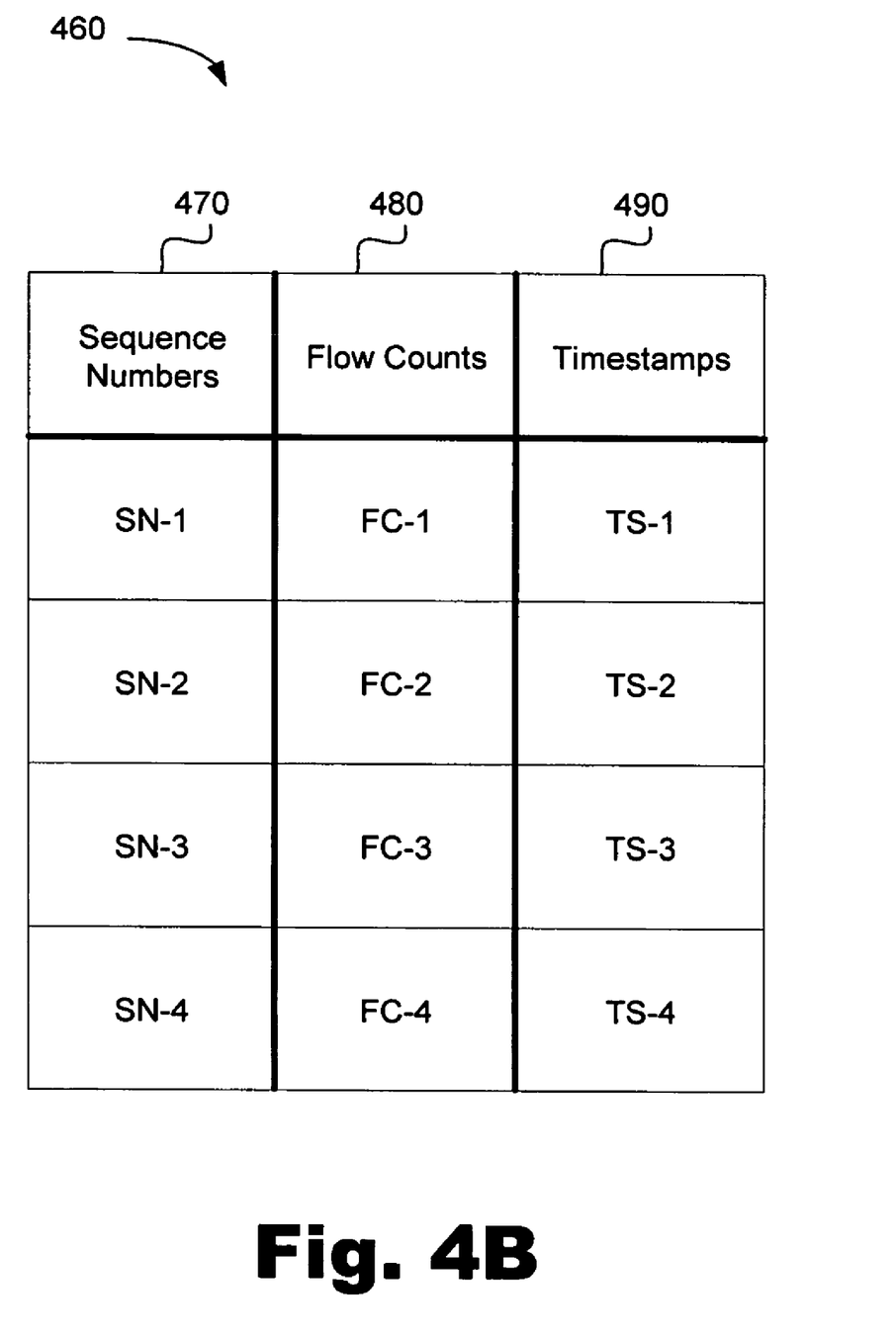
FIG. 4B is a representation of a table of latched data that may be maintained in a particular reference node of FIG. 1, according to an embodiment.

FIG. 4B is a representation of a table 460 of latched data that may be maintained in a particular reference node (e.g., reference node 130). As shown in FIG. 4B, table 460 may include a column of sequence numbers 470, a column of latched flow counts 480, and a column of latched timestamps 490. Each row in the table 460 therefore includes a sequence number and a corresponding flow count and timestamp. The table 460 is associated with a particular flow ID. Accordingly, the table may be identified by its flow ID, and any row of the table 460 may be indexed by its sequence number. A separate table may be maintained for each flow ID. At least a portion of the data stored in the table 460 may be flushed based on predefined aging criteria and/or timer expiration.

The table 460 of FIG. 4B is shown merely by way of example, and other data structures or other tables may be used to store latched data. For example, other tables may include more or less numbers of columns of data. In particular, the table 460 may be extended to include another latched data column and another timestamp column for latching in the bi-directional context described above. In this case, the additional columns would be used to capture the timestamp and latch count corresponding to the opposite direction of a bi-directional flow via the modified count latch control message 430-2 returned by the reflecting reference node 140.

Returning to FIG. 4A, each of the reference nodes 130 and 140 may be configured to respond to a retrieval request by identifying the packet flow associated with the flow ID included in the retrieval request, retrieving latched data from one or more data structures associated with the flow ID, generating a retrieval reply message including the retrieved data, and transmitting the retrieval reply message to the monitoring node 110. A retrieval reply message is one of the five classes of PDM messages described above. FIG. 4A shows that reference node 130 responds to retrieval request message 440-1 by transmitting retrieval reply message 450-1 to monitoring node 110, and reference node 140 responds to retrieval request message 440-2 by transmitting retrieval reply message 450-2 to monitoring node 110.

The retrieved data may include the most recently latched flow count and sequence number pair for the identified packet flow. Alternatively, the retrieved data may include any pair of latched flow count and sequence number specified in a retrieval request message. For example, a retrieval request message may include a sequence number, and the reference nodes 130 and 140 may be configured to use the sequence number to access the corresponding flow counts stored by the reference nodes 130 and 140.

Monitoring node 110 may be configured to send one or more retrieval request messages at any suitable time. For example, retrieval request messages may be transmitted to the reference nodes 130 and 140 upon the monitoring node 110 receiving a latch count message (e.g., modified latch count message 430-2) back from reference node 140 (via reference node 130). Accordingly, monitoring node 110 may retrieve flow count data as it is latched by the reference nodes 130 and 140.

In alternative embodiments, monitoring node 110 may be configured to retrieve latched data periodically, in accordance with a predefined schedule, is in response to the occurrence of a predefined event. In certain embodiments, monitoring node 110 may be configured to retrieve latched data in one or more batches. For example, monitoring node 110 may instruct the reference nodes 130 and 140 to latch flow count data multiple times before retrieving a batch of the latched data from the reference nodes 130 and 140. Batches may be retrieved during off-peak times so as to keep bandwidth and other network resources available to handle peak traffic loads.

Monitoring node 110 may be configured to use the values of the latched data returned in the retrieval reply messages to determine packet delivery measurements for one or more packet flows transmitted between reference nodes 130 and 140. For example, monitoring node 110 may be configured to determine the number of packets lost during transmission of a packet flow, or a portion of a packet flow, between the reference nodes 130 and 140. For example, packet loss for the packet flow from the initiation of the cumulative counting up to a particular point in time can be determined by subtracting a flow count latched at one of the reference nodes 130 or 140 from a corresponding flow count latched by the other reference node. Latched sequence numbers can be used to verify that the flow counts correspond to one another.

Packet loss may be determined for a group of packets, where "group of packets" refers to packets transmitted during a time interval between different instances of flow counts being latched. The sequence numbers stored by the reference nodes 130 and 140 can be used to select a group of packets and to ensure that corresponding data is being used from both reference nodes 130 and 140.

The latching events used to define a group of packets may or may not be consecutive latching events. In cases where consecutive latching events are used to define a group of packets, the group of packets may be referred to as a "block of packets." The difference in latched flow count values between two consecutively latched flow counts (i.e., flow counts having consecutive sequence numbers) at a particular reference node may be referred to as a "block count." Block counts for corresponding blocks from both reference nodes 130 and 140 may be differenced to determine the number of packets lost during transmission of the block between the reference nodes 130 and 140. Corresponding sequence numbers are used to match blocks across the reference nodes 130 and 140.

To further illustrate a determination of packet loss for a block of packets associated with a packet flow, a block count may be determined for a particular block for each of the reference nodes 130 and 140. The sequence numbers associated with the block of reference node 130 should correspond with the sequence numbers associated with the block of reference node 140. Monitoring node 110 may compute the difference between the two block counts, which value is indicative of the number of packets lost during transmission of the packets of the block between the reference nodes 130 and 140. The difference should be computed based on the direction of the packet flow between the reference nodes 130 and 140, with the block count for the downstream reference node being subtracted from the block count for the upstream reference node, where "upstream" and "downstream" are defined by the direction of the packet flow.

From a determined packet loss value, monitoring node 110 can determine the number of packets actually delivered to the downstream reference node. This number can be determined by subtracting the packet loss value from the number of packet flow packets transmitted from the upstream reference during the block. The computed packet loss and packet delivery values may of course be converted to rates defined as a percentage of the number of packet flow packets transmitted from the upstream reference during the block.

Monitoring module 110 may be configured to determine the total number of packets lost for a packet flow by summing the number of packets lost in each block of a packet flow. Even if data for some sequence numbers is missing, the number of packets lost between any two different latch sequence numbers may still be determined as long as data having corresponding latch sequence numbers is retrieved from both reference nodes 130 and 140. Packet delivery values may similarly be summed to determine the total number of packets delivered for a packet flow.

Accordingly, monitoring node 110 is able to determine precise and explicit packet loss and packet delivery measurements for packet flows transmitted between reference nodes 130 and 140. Because a hybrid combination of passive and active packet delivery monitoring functions is employed, system 100 provides accurate packet delivery measurements that are based on actual data.

III. Exemplary Process View

Figure 5:
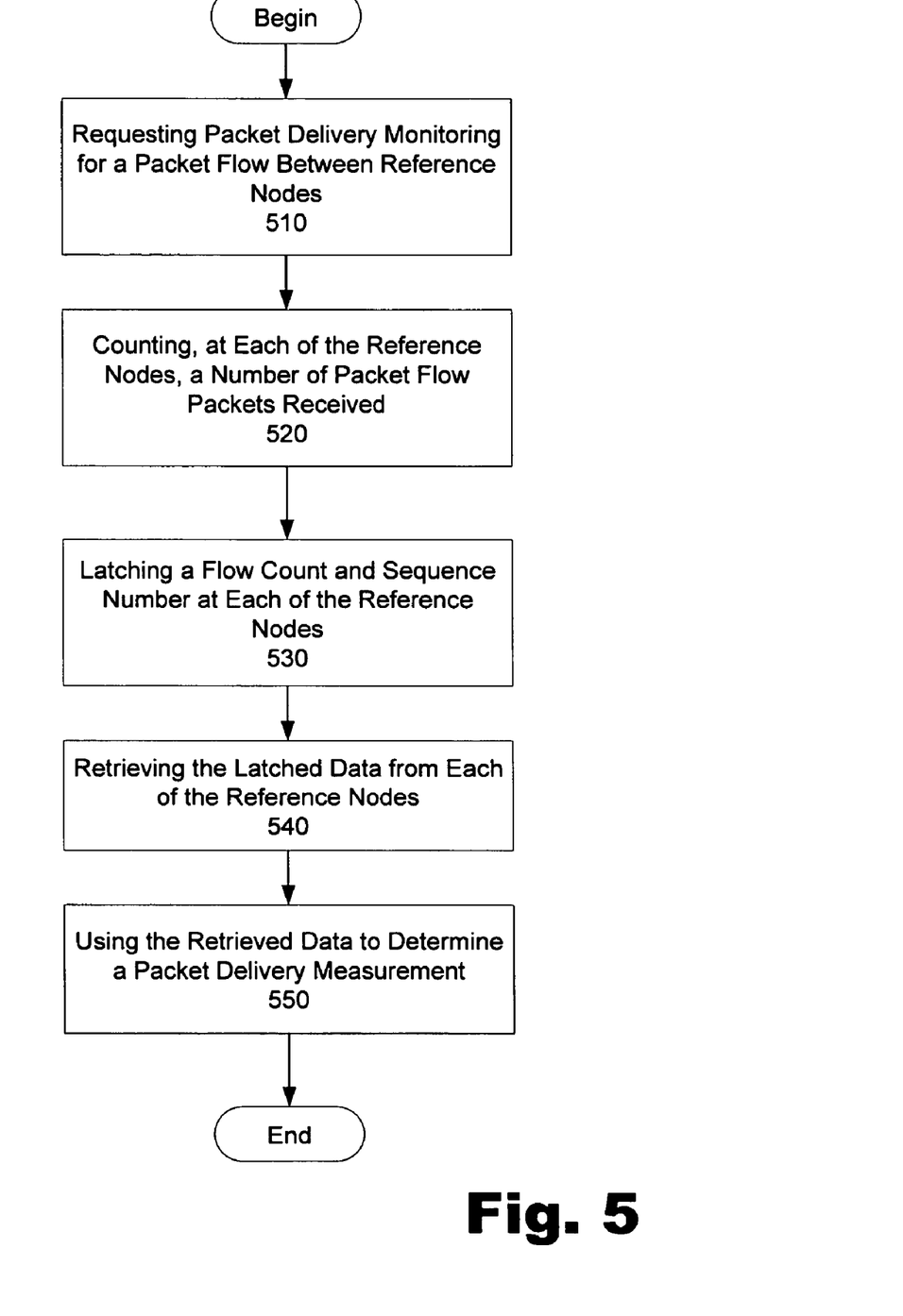
FIG. 5 is a flowchart illustrating an exemplary method for monitoring packet delivery, according to an embodiment.

FIG. 5 is a flowchart illustrating an example of a method for measuring network performance, according to one embodiment. While FIG. 5 illustrates exemplary steps according to one embodiment, other embodiments may omit, add to, and/or modify any of the steps shown in FIG. 5.

The process of FIG. 5 begins by requesting packet delivery monitoring for a packet flow between reference nodes (e.g., reference nodes 130 and 140) in step 510. Step 510 may be performed in any of the ways described above, including monitoring node 110 sending request messages to selected reference nodes. As described above, the reference nodes may reply to monitoring node 110.

In step 520, each of the reference nodes counts a number of packet flow packets received at the reference node. Step 520 may be performed in any of the ways described above, including reference nodes 130 and 140 cumulatively counting the number of flow packets received. The number of flow packets may be referred to as a flow count.

In step 530, a flow count and sequence number is latched at each of the reference nodes. Step 530 may be performed in any of the ways described above, including monitoring node 110 transmitting a count latch message to the reference nodes, and each of the reference nodes latching the flow count and a corresponding sequence number upon receipt of the count latch message. Step 530 may be repeated one or more times to build a table of multiple flow counts at each reference node.

In step 540, the latched data is retrieved from each of the reference nodes. Step 540 may be performed in any of the ways described above, including monitoring node 110 transmitting a retrieve request message to each of the reference nodes, and the reference nodes responding by returning the requested data to the monitoring node 110. Step 540 may be repeated one or more times to retrieve additional flow counts and sequence numbers.

In step 550, the retrieved data is used to determine a packet delivery measurement. Step 550 may be performed in any of the ways described above, including monitoring node 110 computing packet loss and/or packet delivery values for a packet flow, or for a subset of packets (e.g., a block of packets) transmitted between the reference nodes.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. For example, while some of the examples presented above have included two reference nodes being selected for packet delivery monitoring, more than two reference nodes may be selected and used in the same or similar manner to monitor a packet flow. It is intended that the scope of the invention be defined by the following claims.

What is claimed is:

1. A method comprising:
using one or more packet delivery monitoring packets ("PDM packets") to monitor packet delivery between a first reference node and a second reference node communicatively coupled to one another by at least one network path, each of said PDM packets comprising an Internet Control Message Protocol ("ICMP") packet modified to include at least one packet delivery monitoring extension ("PDM extension"), said monitoring including
  cumulatively counting received packets associated with a packet flow being received at said first reference node and said second reference node;
  latching a first count value upon receiving a PDM packet including a received packet count latch ("RPCL") extension acting as a count latch message at said first reference node, said first count value indicating the number of data packets associated with the packet flow that have been received by said first reference node; and
  latching a second count value upon receiving said PDM packet including an RPCL extension at said second reference node, said second count value indicating the number of data packets associated with the packet flow that have been received by said second reference node.

2. The method of claim 1, further comprising including a message type identifier and a message code in said at least one PDM extension, said message code being indicative of a classification of each of said one or more PDM packets.

3. The method of claim 1, further comprising including a packet flow definition in said at least one PDM extension, said packet flow definition being indicative of the packet flow to be monitored.

4. The method of claim 3, further comprising including a flow identifier ("flow ID") in said at least one PDM extension, said flow ID being associated with said packet flow definition and being configured to identify the packet flow.

5. The method of claim 3, further comprising using said packet flow definition to indicate a direction of the packet flow.

6. The method of claim 1, further comprising including in said one or more PDM packets at least one flow identification assignment request message, at least one flow identification assignment reply message, at least one count latch message, at least one count retrieval request message, and at least one count retrieval reply message.

7. The method of claim 1, further comprising transmitting a flow identification assignment request message to said first reference node and said second reference node, said flow identification assignment request message requesting that said first reference node and said second reference node monitor data packets associated with the packet flow transmitted between said first reference node and said second reference node.

8. The method of claim 7, further comprising each of said first reference node and said second reference node responding to said flow identification assignment request message by transmitting a flow identification assignment reply message to a source of said flow identification assignment request message, each said flow identification assignment reply message indicating whether the respective said reference node successfully initialized a packet monitoring function.

9. The method of claim 8, further comprising each of said first reference node and said second reference node counting, in response to receiving said flow identification assignment request message, a number of the data packets associated with the packet flow received by the respective said reference node.

10. The method of claim 9, further comprising transmitting said count latch message to said second reference node by way of said first reference node, said count latch message requesting that each of said first reference node and said second reference node latch a flow count upon receipt of said count latch message.

11. The method of claim 10, further comprising:
said first reference node forwarding said count latch message to said second reference node; and
said second reference node reflecting said count latch message back to its source by way of said first reference node.

12. The method of claim 11, further comprising:
recording a first timestamp corresponding with the transmission of said count latch message from said source of said count latch message;
recording a second timestamp corresponding with said source of said count latch message receiving the reflected said count latch message; and
using said first timestamp and said second timestamp to determine a latency.

13. The method of claim 11, further comprising:
recording a first timestamp corresponding with said first reference node receiving the outgoing said count latch message;
recording a second timestamp corresponding with said first reference node receiving the reflected said count latch message; and
using said first timestamp and said second timestamp to determine a latency.

14. The method of claim 10, further comprising each of said first reference node and said second reference node latching said flow count in response to receiving said flow count message.

15. The method of claim 14, further comprising:
including a sequence number in said flow count message; and
each of said first reference node and said second reference storing said sequence number such that said sequence number is associated with each said flow count.

16. The method of claim 15, further comprising transmitting a retrieval request message to each of said first reference node and said second reference node, said retrieval request message retrieving each said flow count from each of said first reference node and said second reference node, wherein a first flow count is retrieved from said first reference node, and a second flow count is retrieved from said second reference node.

17. The method of claim 16, further comprising including in said retrieval request message a flow identifier and said sequence number to be used to identify each said flow count to be retrieved.

18. The method of claim 17, further comprising each of said first reference node and said second reference node responding to said retrieval request message by transmitting a retrieval reply message to a source of said retrieval request message, each said retrieval reply message including the respective said flow count.

19. The method of claim 18, further comprising using said flow counts to determine a packet delivery measurement associated with the transmission of the packet flow between said first reference node and said second reference node.

20. The method of claim 19, wherein said step of using said flow counts to determine a packet delivery measurement includes determining a number of packets lost by computing a difference between said flow counts.

21. The method of claim 18, further comprising transmitting a subsequent count latch message to said second reference node by way of said first reference node, said subsequent count latch message requesting that each of said first reference node and said second reference node latch a subsequent flow count, each said subsequent flow count being indicative of a subsequent number of data packets associated with the packet flow that have been received by the respective said reference node.

22. The method of claim 21, further comprising:
said first reference node forwarding said subsequent count latch message to said second reference node; and
said second reference node reflecting said subsequent count latch message back to its source by way of said first reference node.

23. The method of claim 21, further comprising transmitting a subsequent retrieval request message to each of said first reference node and said second reference node, said subsequent retrieval request message retrieving each said subsequent flow count from each of said first reference node and said second reference node, wherein a first subsequent flow count is retrieved from said first reference node, and a second subsequent flow count is retrieved from said second reference node.

24. The method of claim 23, further comprising each of said first reference node and said second reference node responding to said subsequent retrieval request message by transmitting a subsequent retrieval reply message to a source of said subsequent retrieval request message, each said subsequent retrieval reply message including the respective said subsequent flow count.

25. The method of claim 24, further comprising using said flow counts and said subsequent flow counts to determine a packet delivery measurement associated with the transmission of a block of the data packets of the packet flow between said first reference node and said second reference node.

26. The method of claim 25, wherein said step of using said flow counts and said subsequent flow counts to determine a packet delivery measurement including determining a number of packets lost in the block by subtracting said flow count from said subsequent flow count for each of said first reference node and said second reference node to obtain a first difference associated with said first reference node and a second difference associated with said second reference node; and further comprising differencing said first difference and said second difference to determine the number of packets lost in the block.

27. A method comprising:
counting, at each of at least two reference nodes, data packets received at the two reference nodes, the data packets selectively associated with a predefined packet flow being transmitted over a path between the two reference nodes;
transmitting a count latch message to the reference nodes requesting the reference nodes to latch respective counts, the reference nodes include a first reference node and a second reference node, said transmitting including transmitting the count latch message to the second reference node by way of the first reference node, the second reference node reflecting the count latch message back to its source by way of the first reference node;
latching, at each of the reference nodes upon receipt of and in response to the count latch message, a count of a number of the data packets associated with the flow received at each of the reference nodes at the time of receipt of the count latch message by the corresponding reference node;
retrieving the latched count from each of the reference nodes; and
using the counts to determine a packet delivery measurement associated with the transmission of the packet flow between the reference nodes;
requesting the reference nodes to latch the respective counts, said requesting step including transmitting the count latch message to the reference nodes, each of the reference nodes performing said latching step in response to receiving the count latch message;
wherein the reference nodes include a first reference node and a second reference node, and wherein said transmitting step includes transmitting the count latch message to the second reference node by way of the first reference node, the second reference node reflecting the count latch message back to its source by way of the first reference node.

28. The method of claim 27, wherein said using step includes determining a number of packets lost by computing a difference between the counts.

29. The method of claim 27, further comprising the first reference node performing said latching step in response to either receiving the outgoing count latch message or receiving the reflected count latch message, based on either a direction of the packet flow indicated in the count latch message or a value of a reference node counter included in the count latch message.

30. The method of claim 27, further comprising the first reference node latching a first count of the data packets associated with the packet flow in response to receiving the outgoing count latch message, and the second reference node latching a second count of the data packets associated with the packet flow in response to receiving the outgoing count latch message.

31. The method of claim 30, further comprising the second reference node latching a third count in response to the second reference node reflecting the count latch message, and the first reference node latching a fourth count in response to receiving the reflected count latch message, the third count and the fourth count associated with a second packet flow being transmitted between the reference nodes.

32. The method of claim 27, further comprising:
recording a first timestamp corresponding with said step of transmitting the count latch message, recording a second timestamp corresponding with a receipt of the reflected count latch message at the source of the count latch message, and using the first timestamp and the second timestamp to determine a latency.

33. The method of claim 27, further comprising:

recording a first timestamp corresponding with the first reference node receiving the outgoing count latch message;

recording a second timestamp corresponding with the first reference node receiving the reflected count latch message, and using the first timestamp and the second timestamp to determine a latency.

34. The method of claim 27, further comprising:

requesting the reference nodes to latch subsequent counts, said requesting step including transmitting a subsequent count latch message to the reference nodes;

latching, at each of the reference nodes, a subsequent count of a subsequent number of the data packets received at each of the reference nodes;

retrieving the latched subsequent count from each of the reference nodes; and using the counts and the subsequent counts to determine a packet delivery measurement associated with the transmission of a block of the data packets associated with the packet flow between the reference nodes.

35. A method comprising:

counting cumulatively received data packets at each of a first reference node and a second reference node, said nodes transmitting a packet flow between one another over at least one network path, the data packets selectively associated with the packet flow;

latching a count of a number of the data packets received at each of said first reference node and said second reference node upon receipt of a count latch message;

requesting said first reference node and said second reference node to latch their respective said counts by transmitting said count latch message to said first reference node and said second reference node, said count latch message including a sequence number to be associated with the respective said counts, said counts being indicative of the number of packets associated with the flow received at the respective reference nodes at the time of receipt of the count latch message by the respective reference nodes;

requesting each of said first reference node and said second reference node to latch a subsequent count by transmitting a subsequent count latch message to said first reference node and said second reference node, said subsequent count latch message including a subsequent sequence number to be associated with the respective said subsequent counts;

retrieving the respective said counts and the respective said subsequent counts from said first reference node and said second reference node; and using said counts and said subsequent counts to determine a packet delivery measurement associated with the transmission of a block of the data packets associated with the packet flow between said first reference node and said second reference node.

\* \* \* \* \*